3,530,202
HIGH TEMPERATURE UNSATURATED
POLYESTER
Frank Fekete, Monroeville, and John S. McNally, Arnold,
Pa., assignors to Koppers Company, Inc., a corporation
of Delaware
Filed June 5, 1967, Ser. No. 643,466
Int. Cl. C08f 21/02
U.S. Cl. 260—861                          2 Claims

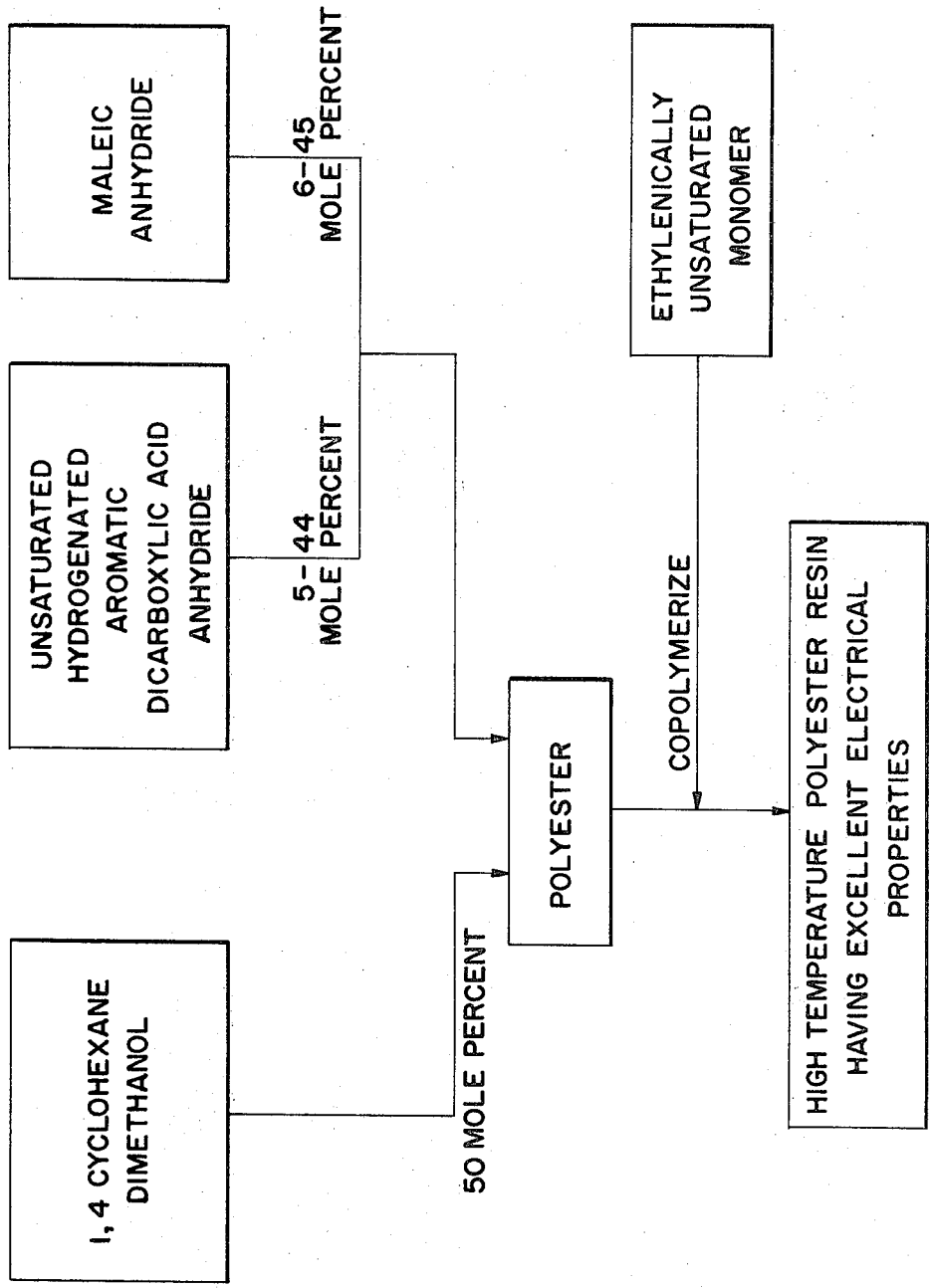

ABSTRACT OF THE DISCLOSURE

An unsaturated polyester, having excellent electrical and high temperature properties when copolymerized with a monomer such as styrene or vinyl toluene is formed by reacting 1,4-cyclohexane dimethanol with maleic anhydride and an unsaturated, hydrogenated aromatic dicarboxylic acid such as tetrahydrophthalic anhydride. The copolymerized polyester resin is useful in electrical applications as a replacement for wood, ceramics, and rubber materials or the like.

BACKGROUND OF THE INVENTION

The electrical industry, due to current trends and changes in technology, has become an increasingly attractive market for plastic materials as replacements for conventional materials made of wood, ceramics, rubber and the like. For economic reasons, unsaturated polyesters (due to the large amounts of relatively inexpensive cross-linking monomers such as styrene used therein) appear to be the most desirable general purpose plastic materials, the polyester must have good high temperature properties as well as good electrical and mechanical properties.

Unsaturated polyesters made with 1,4-cyclohexane dimethanol are known to possess superior electrical properties and heat distortion temperatures. However, when the dicarboxylic acid component is maleic anhydride, the resulting polyester is not completely soluble in ethylenically unsaturated monomers such as styrene which are normally used as both solvent and copolymerizable monomers to cure or crosslink the polyester. A polyester made by condensing 1,4-cyclohexane dimethanol with maleic anhydride, when later mixed with styrene, results in an opaque two-phase system.

It has been suggested in the literature that this monomer incompatibility may be overcome by substituting phthalic anhydride for portions of the maleic anhydride. However, when amounts of phthalic anhydride, sufficient to achieve monomer compatibility, are added, the resulting polyester, after being cured or crosslinked with the styrene is found to have excessive weight losses (thermal instability) when exposed to high temperatures (30% weight loss after 8 days at 220° C.) which is highly unsatisfactory in a resin specially prepared for exposure to high temperatures. The same problem arises, if, instead of replacing a portion of the maleic anhydride with phthalic anhydride, a portion of the 1,4-cyclohexane dimethanol is replaced by a more common dihydroxy alcohol such as ethylene glycol or neopentyl glycol, i.e. when amounts sufficient to achieve monomer compatibility are added, the weight loss or thermal stability is deleteriously affected.

SUMMARY OF THE INVENTION

Quite surprisingly, it has now been discovered that 1,4-cyclohexane dimethanol polyesterified with a combination of maleic anhydride and an unsaturated hydrogenated aromatic dicarboxylic anhydride, such as tetrahydrophthalic anhydride, results in a polyester which, when crosslinked with an ethylenically unsaturated monomer such as styrene, has high thermal resistance, good heat distortion values, and excellent electrical properties, as well as good mechanical and chemical properties, while still achieving some degree of monomer compatibility. This combination of properties was quite unexpected since the addition of phthalic anhydride (as mentioned above) to a 1,4-cyclohexane dimethanol-maleic anhydride polyester resulted in lowering of thermal resistance.

In accordance with the invention, a polyester composition which, when copolymerized with an ethylenically unsaturated monomer, is characterized by excellent high temperature and electrical properties, is formed by the esterification of 1,4-cyclohexane dimethanol and unsaturated dicarboxylic acid anhydrides; the unsaturated dicarboxylic acid anhydrides consisting essentially of:

(1) 7–15 mole percent of an unsaturated, hydrogenated aromatic dicarboxylic acid anhydride; and (2) 35–43 mole percent of maleic anhydride, the sum of the total mole percent of the unsaturated dicarboxylic acid anhydrides in the polyester being 50 mole percent of the total moles of dihydric alcohols and dicarboxylic acid anhydrides.

DETAILED DESCRIPTION

The polyester of the invention is made by reacting equimolar amounts of dihydric alcohols and dicarboxylic acids or their anhydrides. The esterification reaction between a carboxylic acid and an alcohol to form an ester is given by the equation below:

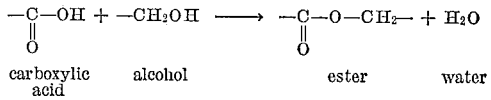

When difunctional molecules are used, i.e. dicarboxylic acids and dihydric alcohols, the ester will also have a hydroxyl end group and a carboxylic acid end group as illustrated below:

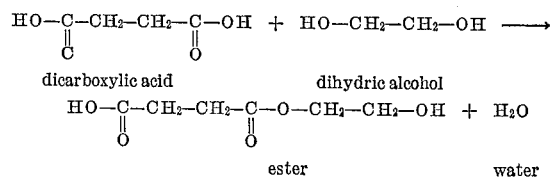

Each of these end groups are then available to repeat the esterification reaction illustrated above by reacting with more acid and more alcohol respectively. If all the acids and alcohols used as reactants be difunctional, the polyester molecule chains can be built to great length. However, the reaction is reversible and hence, the water formed must be removed. This is one of several practical limitations as to the size of the polyester molecule.

Another important consideration as to high molecular weight is the ratio of amounts of acid and alcohol used. If a large excess of either acid or alcohol is used, the growth of the polyester molecule may be inhibited, since the formation of the ester linkages is dependent upon the reaction of one acid group with one alcohol group. Therefore, the mole ratio of the dicarboxylic acids or their anhydrides to the dihydric alcohol in the polyester must be about one to one. However, it is customary in the art (due to loss of some dihydric alcohol from the reactor by boiling off the by-product water, which as mentioned earlier, must be removed to allow the esterification reaction to proceed) to charge small amounts of excess dihydric alcohol to the reactor. However, it should be noted that 1,4-cyclohexane dimethanol boils in a range of 284–288° C. depending upon the proportions of cis and trans isomers present. Therefore, dihydric alcohol losses and resultant need for excess dihydric alcohol during the esterification (which is carried on at temperatures generally in the range of 200–215° C. or below) are minimal.

1,4-cyclohexane dimethanol, as mentioned above, exists in two isomeric forms, cis and trans. Either isomer or mixtures thereof are suitable for use in the invention. The cis isomer has a boiling point of 288° C. and the trans isomer boils at 284° C. A typical mixture of 70% trans and 30% cis boils at 285° C. The use of 1,4-cyclohexane dimethanol in accordance with the invention, results in a polyester having excellent high temperature properties when cured with a cross-linking monomer such as styrene.

The unsaturated, hydrogenated aromatic dicarboxylic acid anhydride comprises a dicarboxylic acid anhydride having an aromatic backbone which has been partially hydrogenated leaving one double bond in the ring. Examples of such dicarboxylic acid anhydrides include tetrahydrophthalic anhydride, endo-cis-bicyclo (2.2.1)-5-heptene-2,3-dicarboxylic acid anhydride having the formula:

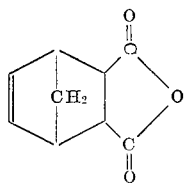

and alkyl substituted endo-cis-bicyclo (2.2.1)-5-heptene-2,3-dicarboxylic acid anhydrides having the formula:

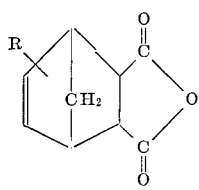

where R is lower alkyl.

In accordance with the invention, the unsaturated, hydrogenated aromatic dicarboxylic acid anhydride is used in amounts ranging from 7–15 mole percent of the polyester. The limitations placed upon the amount of this anhydride in the polyester of the invention are keyed to the high temperature properties desired as well as monomer compatibility.

If less than 7 mole percent be used, the polyester tends to separate out of the monomer, forming a two-phase system. However, when amounts greater than 15 mole percent be used, the heat distortion temperature is reduced below acceptable limits (below about 200° F.).

Within this range of 7–15 mole percent unsaturated, hydrogenated aromatic dicarboxylic acid anhydride it has been found that higher amounts of maleic anhydride result in higher heat distortion temperatures and faster curing times (because of the higher reactivity of the maleic double bond compared with the double bond in the unsaturated hydrogenated aromatic dicarboxylic acid anhydride); however the compatibility with ethylenically unsaturated monomers is better when lesser amounts of maleic within the range specified are used.

The third component in the polyester is maleic anhydride. The term maleic anhydride is intended herein to embrace its isomeric counterpart fumaric acid and the use of the term anhydride as used throughout the description is intended to embrace both the acid and anhydride states of those dicarboxylic acids which can have anhydride states. In accordance with the invention, the maleic anhydride is present in a minimum amount of 35 mole percent to insure a minimum degree of hardness to the polyester as discussed above. The maximum amount of maleic anhydride useable is 43 mole percent of the total moles in the polyester. The amount, within these ranges, used is dependent upon the amount of unsaturated, hydrogenated aromatic dicarboxylic acid anhydride present. The sum of the total moles of all the anhydrides in the polyester.

The polyester may be prepared in the presence of gelation inhibitors such as hydroquinone or the like, such as are well known in the art. Likewise, esterification catalysts well known in the art may also be used in the esterification.

The esterification is carried out under an inert blanket of gas such as nitrogen. The esterification is carried out in a temperature range of 180–220° C. for a period of about 6–20 hours until an acid number of below 100 and preferably below 50 is obtained (based on milliequivalents of KOH necessary to neutralize 1 gram of the polyester).

The resulting polyester may be dissolved in and subsequently copolymerized with any of the well-known ethylenically unsaturated monomers used as solvents and copolymerizable monomers for polyesters. Examples of such monomers include styrene, alpha-methyl styrene, vinyl toluene, divinyl benzene, chlorostyrene, and the like as well as mixtures of the above monomers. The use of the term polyester herein is defined as the esterification product of dihydric alcohols and dicarboxylic acids or their anhydrides, while the term polyester resin is defined as a polyester dissolved in, or cross-linked with a monomer such as described above.

The following examples will serve to further illustrate the invention.

EXAMPLE I

To a nitrogen purged reaction vessel was charged 4 moles of 1,4-cyclohexane dimethanol, 1 mole of tetrahydrophthalic anhydride and 3 moles of maleic anhydride. 200 p.p.m. of hydroquinone inhibitor was added and the temperature of the reaction vessel was raised to 190° C. and then maintained at 190–200° C. for 14 hours until the polyester reached an acid number of 27.

Weighed amounts of the polyester were added to sufficient amount of liquid vinyl toluene monomer to provide a solution containing 40% by weight monomer, 60% by weight polyester. The solution was somewhat cloudy, but did not separate into two phases. Castings were prepared by adding ¾% by weight 2,5-dimethylhexane 2,5-diperoctoate catalyst and curing for 2 hours at 60° C., and then 1 hour at 75° C. followed by 2 hours at 135° C. The castings, after curing, were clear.

The castings were tested for heat distortion values and weight loss. For comparative purposes, castings made from a conventional ethylene glycol-phthalic anhydride-maleic anhydride polyester in 40% vinyl toluene and cured as above were simultaneously tested. The results are indicated below:

TABLE I

| | Conventional EG-PA-MA Polyester | 1,4-cyclohexane dimethanol tetrahydrophthalic anhydride maleic anhydride polyester |
|---|---|---|
| Heat Distortion Temperature, ° F | 201–203 | 215–217 |
| Weight Loss (8 days at 220° C.), percent | 48–53 | 5.9–6.1 |

EXAMPLE II

A series of ASTM electrical measurements tests were run on the castings prepared in Example I from the polyester of the invention. The results are tabulated as follows:

TABLE II

| ASTM Test | Property | Measurement |
|---|---|---|
| D257 | Volume Resistivity | .671×10$^{16}$ ohm-cm. |
| D257 | Surface Resistivity | .269×10$^{16}$ ohms. |
| D257 | Insulation Resistance | 1.25×10$^{14}$ ohms. |
| D150 | Dissipation Factor (at 1KC) | .0071. |
| D150 | Power Factor (at 1KC) | .06%. |
| D150 | Dielectric Constant (at 1KC) | 3.57. |
| D495 | Arc Resistance | 93.1 seconds. |
| D2303 | Track Resistance | 1,000 minutes. |
| D149 | Dielectric Strength (perpendicular). | 471–475 volts per mil thickness. |
| D229 | Dielectric Strength (surface) | 56.1–57.2 kilovolts. |

The above ASTM test results indicate that the polyester resin of the invention possesses electrical properties comparable to other resins such as epoxies presently used in the electrical industry. However, in contrast to conventional polyester resins, the polyester resins of the invention possess both good heat distortion temperatures and excellent thermal stability. The polyesters of the invention are mixed with relatively inexpensive crosslinking monomers and when cured therewith form clear castings. Thus, high temperature properties and good electrical properties may be achieved in a polyester resin which contains large amounts of relatively inexpensive cross-linking monomers.

What is claimed is:

1. A polyester composition, soluble in an ethylenically unsaturated monomer selected from the class consisting of styrene, alpha-methyl styrene, vinyl toluene, divinyl benzene, and chloro-styrene, which when copolymerized with the monomer, is characterized by excellent high temperature and electrical properties, formed by the esterification of 1,4-cyclohexane dimethanol and unsaturated dicarboxylic acid anhydrides; the unsaturated dicarboxylic acid anhydrides consisting essentially of:

(1) 7–15 mole percent of tetrahydrophthalic anhydride or endo-cis-bicyclo(2.2.1)-5-heptene-2,3-dicarboxylic acid anhydride; and (2) 35–43 mole percent of maleic anhydride, the sum of the total mole percent of the dicarboxylic acid anhydrides in the polyester being 50 mole percent of the total moles of dihydric alcohols and dicarboxylic acid anhydrides.

2. A polyester resin comprising an ethylenically unsaturated monomer selected from the class consisting of styrene, alpha-methyl styrene, vinyl toluene, divinyl benzene and chloro-styrene and an unsaturated polyester, which is soluble in the ethylenically unsaturated monomer, which when copolymerized with the monomer, is characterized by excellent high temperature and electrical properties, said unsaturated polyester being formed by esterifying:

(a) 50 mole percent 1,4-cyclohexane dimethanol; with (b) 7–15 mole percent tetrahydrophthalic anhydride; and (c) 35–43 mole percent maleic anhydride, for a period of 6–20 hours at a temperature of 180–220° C. in an inert atmosphere until the polyester reaches an acid number below 100.

References Cited

UNITED STATES PATENTS 3,275,710   9/1966   Wooster _____ 260—863

FOREIGN PATENTS 6400444   7/1964   Netherlands.

OTHER REFERENCES

Boenig, Unsaturated Polyesters, Elsevier, New York, 1964, page 189.

Goodman et al., Polyesters, vol. 1, Elsevier, New York, 1966, page 8.

WILLIAM H. SHORT, Primary Examiner

M. GOLDSTEIN, Assistant Examiner

U.S. Cl. X.R.

260—75, 869, 871